United States Patent [10] Patent No.: US 12,511,682 B2
Phillips et al. (45) Date of Patent: Dec. 30, 2025

(54) SYSTEM AND METHOD FOR IMPULSE PURCHASE PROMPTING

(71) Applicant: Frito-Lay North America, Inc., Plano, TX (US)

(72) Inventors: John S. Phillips, Plano, TX (US); George Benjamin Mayfield, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 2 days.

(21) Appl. No.: 18/380,051

(22) Filed: Oct. 13, 2023

(65) Prior Publication Data

US 2024/0054547 A1 Feb. 15, 2024

Related U.S. Application Data

(62) Division of application No. 17/208,698, filed on Mar. 22, 2021, now abandoned.

(Continued)

(51) Int. Cl.
G06Q 30/00 (2023.01)
G06Q 20/32 (2012.01)
(Continued)

(52) U.S. Cl.
CPC ..... *G06Q 30/0631* (2013.01); *G06Q 20/3276* (2013.01); *G06Q 20/4015* (2020.05)

(58) Field of Classification Search
None
See application file for complete search history.

(56) References Cited

U.S. PATENT DOCUMENTS

2007/0265937 A1* 11/2007 Aitkins ............. G06Q 30/0641
705/26.81
2012/0209657 A1* 8/2012 Connolly ........... G06Q 20/3224
705/26.7

(Continued)

FOREIGN PATENT DOCUMENTS

WO 2013142209 9/2013

OTHER PUBLICATIONS

International Search Report and Written Opinion Issued on Jul. 5, 2021 in PCT/US2021/023481.

(Continued)

*Primary Examiner* — Christopher Stroud
(74) *Attorney, Agent, or Firm* — Barnes & Thornburg LLP; G. Peter Nichols

(57) ABSTRACT

A method of prompting impulse purchases includes detecting a position of a customer at an impulse purchase location via an impulse purchase prompt initiator, automatically transmitting, via the impulse purchase prompt initiator, an impulse purchase prompt to the customer, fulfilling, in near-real time, an impulse purchase request transmitted by the customer in response to the impulse purchase prompt via the impulse purchase prompt initiator automatically sending a signal to a communications module of an automated locker, and automatically opening the at least one storage compartment and dispensing a product associated with the impulse purchase. The automated locker includes storage that is temperature controlled so as to lower a temperature of the product, and the impulse purchase prompt is only automatically transmitted in response to the temperature of the product being equal to or less than a predetermined temperature.

19 Claims, 16 Drawing Sheets

Related U.S. Application Data

(60) Provisional application No. 62/992,848, filed on Mar. 20, 2020.

(51) Int. Cl.
  *G06Q 20/40* (2012.01)
  *G06Q 30/0601* (2023.01)

(56) References Cited

U.S. PATENT DOCUMENTS

| | | | | |
|---|---|---|---|---|
| 2014/0214562 A1* | 7/2014 | Cancro | ............ | G06Q 30/0631 |
| | | | | 705/16 |
| 2015/0022313 A1* | 1/2015 | Maier | ............ | G05B 1/01 |
| | | | | 340/5.1 |
| 2015/0356809 A1* | 12/2015 | Carroll | ............ | G06Q 30/0631 |
| | | | | 700/236 |
| 2016/0180391 A1* | 6/2016 | Zabaneh | ............ | G06F 16/9535 |
| | | | | 705/14.58 |
| 2017/0215620 A1* | 8/2017 | Dade | ............ | F25D 17/00 |
| 2017/0287258 A1* | 10/2017 | Gerhard | ............ | G07F 9/105 |
| 2017/0351276 A1* | 12/2017 | Setchell | ............ | G01K 3/005 |
| 2017/0363479 A1* | 12/2017 | Harvey | ............ | G01K 11/12 |
| 2018/0232716 A1* | 8/2018 | Conforti | ............ | G06Q 30/0639 |
| 2018/0276739 A1 | 9/2018 | Chopp | | |
| 2019/0138988 A1* | 5/2019 | High | ............ | B64U 10/13 |
| 2019/0325367 A1* | 10/2019 | Tovey | ............ | G06Q 20/3274 |
| 2019/0344965 A1* | 11/2019 | Wilkinson | ............ | G07F 11/42 |
| 2019/0362332 A1* | 11/2019 | Huang | ............ | G06Q 20/3278 |
| 2020/0247662 A1* | 8/2020 | Wade | ............ | B67D 1/0888 |
| 2021/0158461 A1* | 5/2021 | Nagy | ............ | G01S 19/51 |
| 2021/0224864 A1* | 7/2021 | Royce | ............ | G06F 16/22 |
| 2021/0398188 A1* | 12/2021 | Jafa | ............ | G06Q 30/0627 |
| 2025/0005868 A1* | 1/2025 | Singh | ............ | G06F 3/011 |

OTHER PUBLICATIONS

International Preliminary Report on Patentability Issued on Sep. 20, 2022 in PCT/US2021/023481.

* cited by examiner

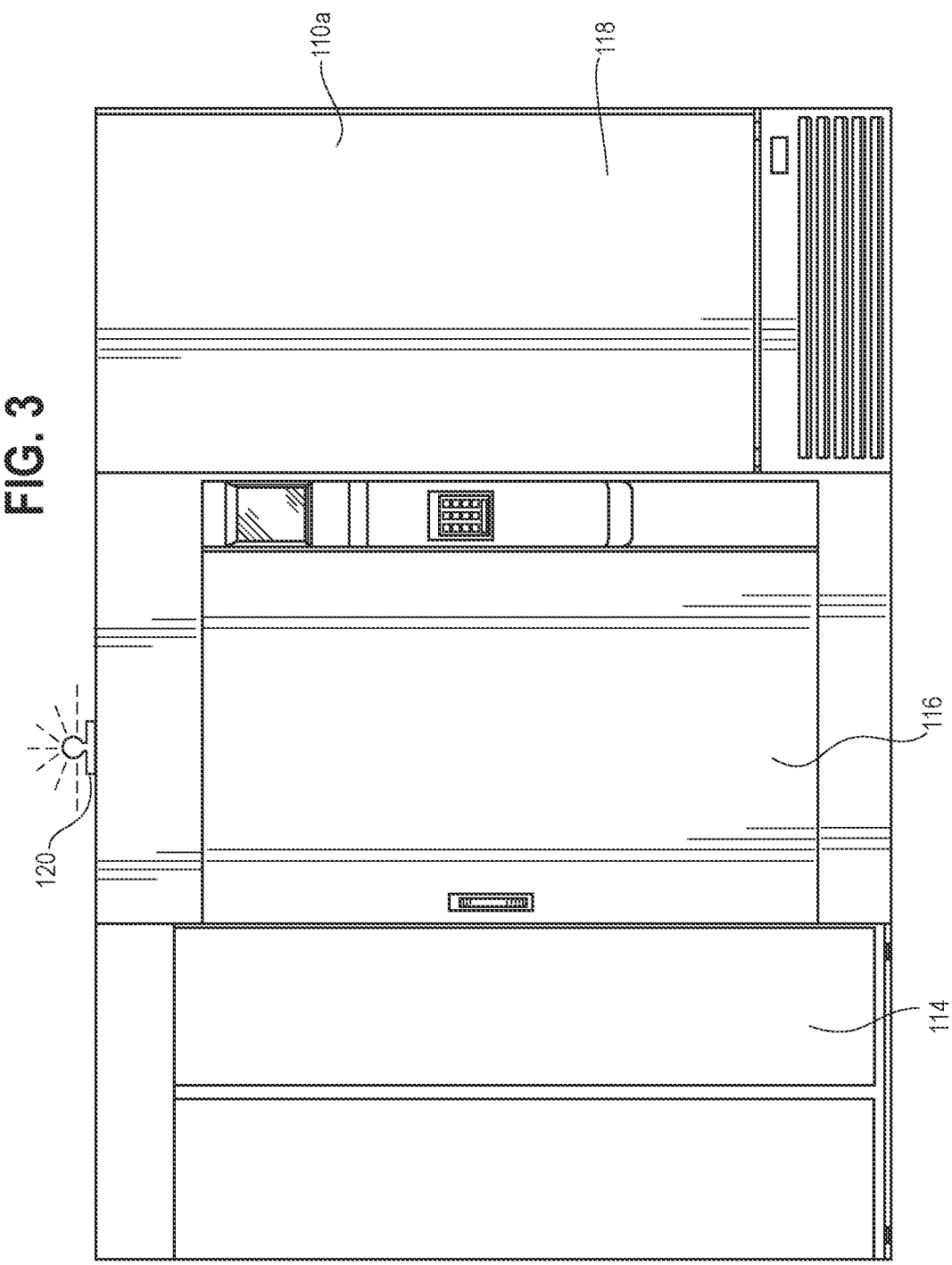

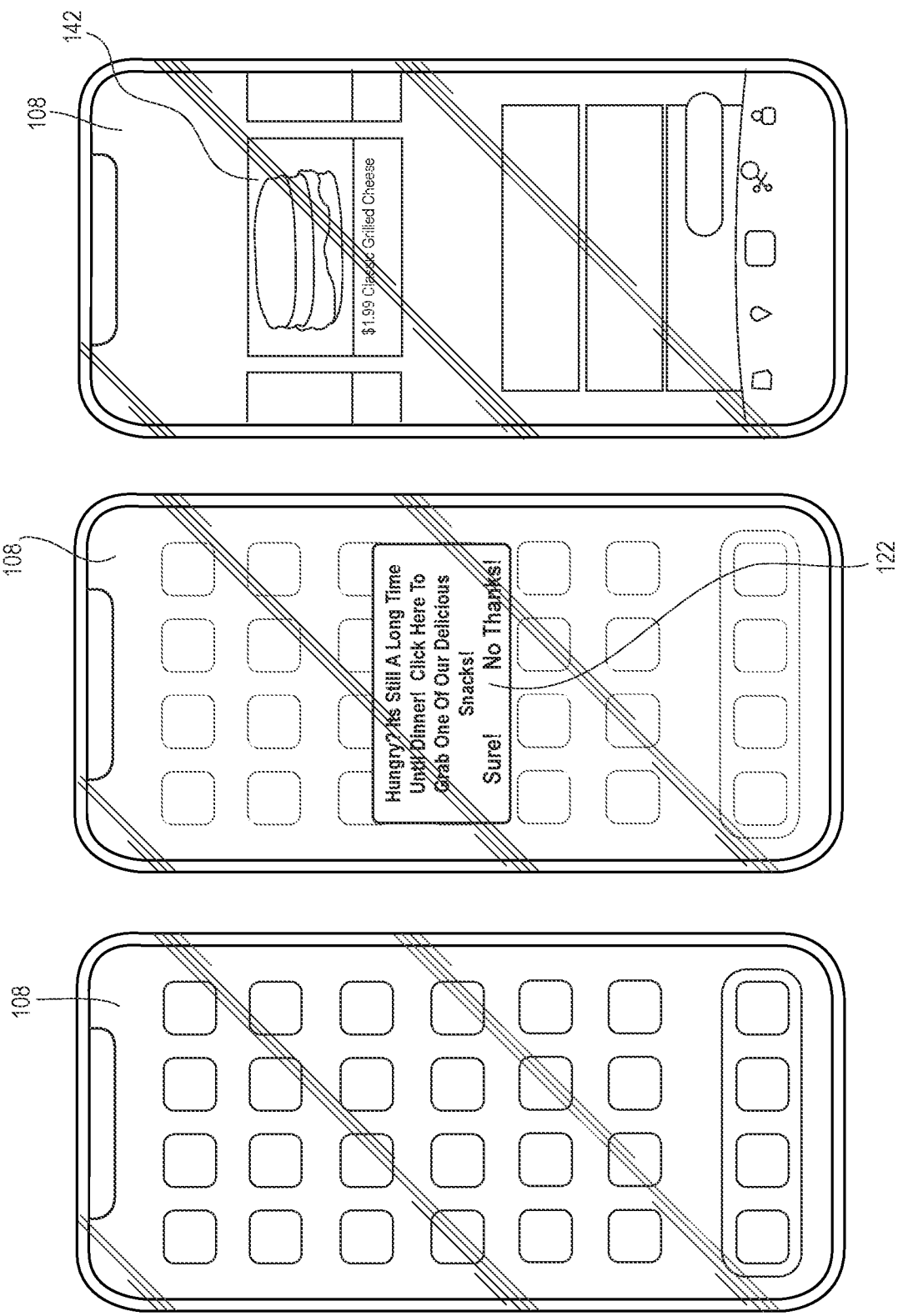

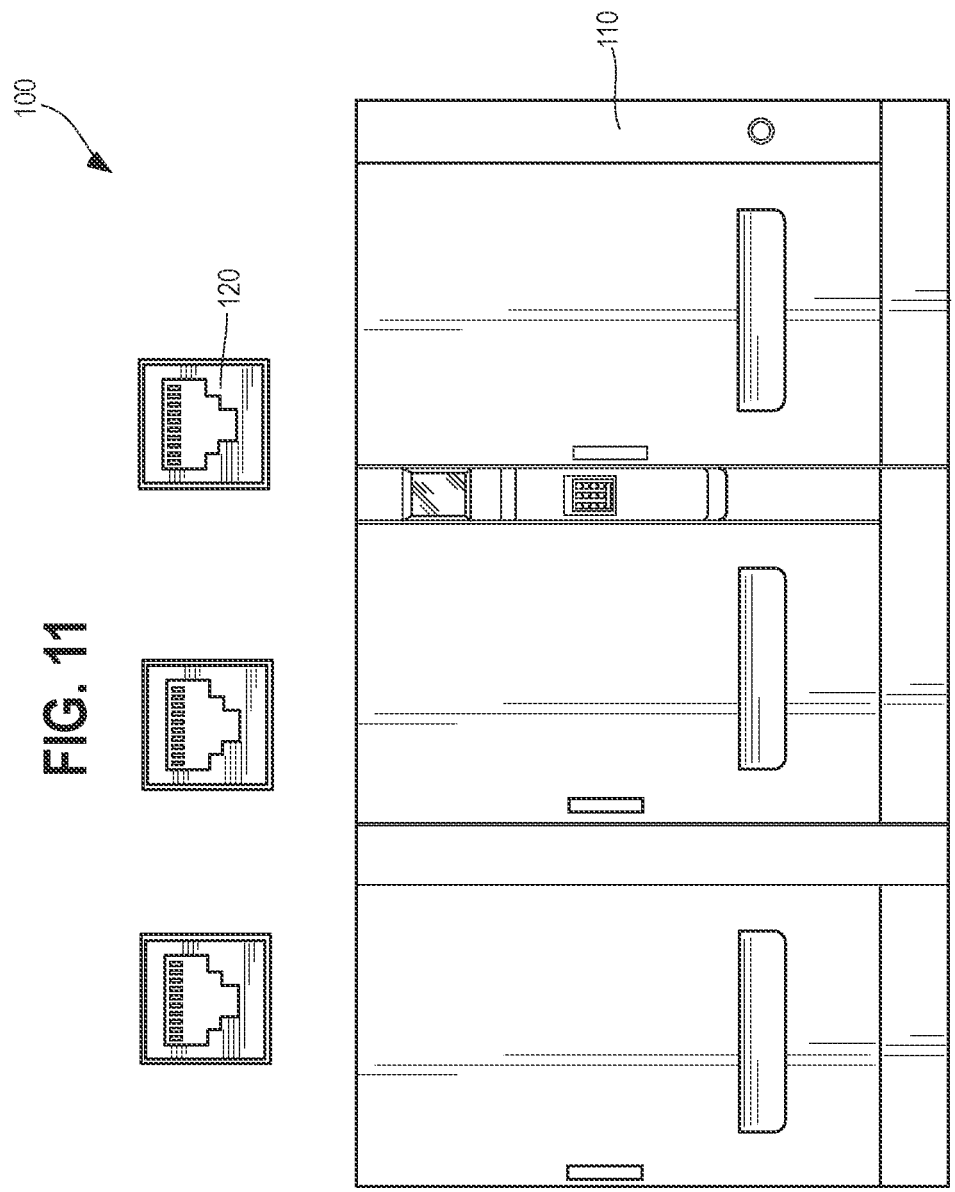

SYSTEM AND METHOD FOR IMPULSE PURCHASE PROMPTING

CROSS-REFERENCE TO RELATED APPLICATION(S)

This application is a divisional application of co-pending U.S. patent application Ser. No. 17/208,698, which was filed on Mar. 22, 2021, which was based upon and claims the benefit of priority of U.S. Provisional Patent Application No. 62/992,848, filed Mar. 20, 2020, for "System and Method for Impulse Purchase Prompting", the entire disclosures of which are hereby incorporated by reference herein.

TECHNICAL FIELD

The present subject matter relates to retail and online purchases, and more particularly, to prompting of impulse purchases.

BACKGROUND

Online shopping has become ubiquitous. When a shopper makes predetermined selections online, through a web interface, mobile application interface, or otherwise without visiting a retail establishment, opportunities for retailers to capture revenue from impulse purchases may be negatively impacted. Many retailers may benefit from re-capturing impulse purchasing from customers engaged in online shopping. Similarly, producers of certain goods that particularly benefit from impulse purchase decisions may wish to re-capture impulse purchasing. Often times, online shoppers, especially for groceries or other goods associated with groceries, will still visit a retail establishment in order to pick up an advance grocery/product order.

Typically, the online shopper will arrive at the retail establishment and either personally pick up their previously selected order, which has been collected (or "shopped") for them by an employee or contractor of the retail establishment, or allow an employee or contractor associated with the retail establish to load the previously selected order into a vehicle of the online shopper. The pick-up and/or loading activities often take place outside or adjacent the main retail space. These types of transactions are often paid for through the same web and/or mobile application interfaces used for selecting and transmitting the predetermined selections to the retail establishment. As a result, the online shopper is unlikely to traverse a checkout lane or even enter a checkout area during the pick-up/loading. Similarly, in certain other retail formats, such as drive-through windows, fuel pump islands, vending, food service/pick-up, etc., a shopper may not have direct interaction with a checkout area where items subject to impulse purchase decisions may be displayed.

Impulse purchases are often profitable for both retailers and product manufacturers/suppliers. Furthermore, customers retrieving an online purchase, such as a grocery pick-up, may still be open to impulse purchases. Therefore, a system and method for prompting impulse purchases during pick-up/loading activities, at a drive-through window/lane, or at a fuel pump island, represents an improvement in the art.

The description provided in the background section should not be assumed to be prior art merely because it is mentioned in or associated with the background section. The background section may include information that describes one or more aspects of the subject technology.

SUMMARY

According to an aspect of the disclosure, a method of prompting impulse purchases includes detecting a position of a customer, automatically transmitting an impulse purchase prompt to the customer, fulfilling an impulse purchase request transmitted by the customer, and automatically opening an automated locker. Specifically, the method includes detecting a position of a customer at an impulse purchase location via an impulse purchase prompt initiator including a processor, the impulse purchase location including a pickup location, the detection of the position of the customer executed via at least one of a Bluetooth connection, a geofence detection, a wireless connection, or a camera detection.

The method further includes, in response to the position of the customer being located at a predetermined distance away from the pickup location and in advance of the customer arriving at the pickup location, automatically transmitting, via the impulse purchase prompt initiator, an impulse purchase prompt to the customer. The method also includes fulfilling, in near-real time, an impulse purchase request transmitted by the customer in response to the impulse purchase prompt via the impulse purchase prompt initiator automatically sending a signal to a communications module of an automated locker including at least one storage compartment, the communications module being communicatively coupled to the impulse purchase prompt initiator. The signal is indicative of the impulse purchase request transmitted in response to the impulse purchase prompt.

The method further includes automatically opening the at least one storage compartment and dispensing a product associated with the impulse purchase request prior to arrival of the customer or a fulfilment associate at the automated locker, the automatic sending of the signal to the communications module of the automated locker automatically causes the at least one storage compartment to open and dispense the product prior to arrival of the customer or a fulfilment associate at the automated locker. In some embodiments, the at least one storage compartment is temperature controlled so as to lower a temperature of the product, and the impulse purchase prompt is only automatically transmitted in response to the temperature of the product being equal to or less than a predetermined temperature.

In some embodiments, the detection of the customer comprises an interaction with a mobile device associated with the customer. In some embodiments, the interaction with the mobile device comprises passive detection of a mobile device associated with the customer. In some embodiments, the impulse purchase prompt comprises a notification on the mobile device associated with the customer. In some embodiments, the impulse purchase prompt suggests a specific product to the customer. In some embodiments, the impulse purchase prompt opens a mobile application associated with an impulse purchase location in response to approval of the notification by the customer.

In some embodiments, the interaction comprises a user-initiated interaction with an information carrier present at an impulse purchase location. In some embodiments, the user-initiated interaction comprises scanning a QR code with the mobile device associated with the customer.

In some embodiments, the at least one storage compartment includes a first storage compartment and a second storage compartment, the first storage compartment having a first internal temperature that is lower than a second internal temperature of the second storage compartment, and the method further includes adjusting the first internal temperature and the second internal temperature in response to seasonal changes in impulse purchasing behavior of customers. In some embodiments, the at least one storage compartment includes a single location of interaction which includes a dispensing location at which a product associated with the impulse purchase request is dispensed and a QR code scanning location In some embodiments, the method further includes, in response to the impulse purchase request being transmitted by the customer in response to the impulse purchase prompt, automatically transmitting, via the impulse purchase prompt initiator, a further impulse purchase prompt to the customer that is related to the product associated with the impulse purchase request.

According to another aspect of the present disclosure, a method of prompting impulse purchases includes detecting a position of a customer, and automatically transmitting an impulse purchase prompt to the customer, fulfilling an impulse purchase request transmitted by the customer. Specifically, the method includes detecting a position of a customer at an impulse purchase location via an impulse purchase prompt initiator including a processor, the impulse purchase location including a pickup location.

The method further includes, in response to the position of the customer being located at a predetermined distance away from the pickup location, automatically transmitting, via the impulse purchase prompt initiator, an impulse purchase prompt to the customer. The method also includes fulfilling, in near-real time, an impulse purchase request transmitted by the customer in response to the impulse purchase prompt via the impulse purchase prompt initiator automatically sending a signal to a communications module of an automated locker including at least one storage compartment, the communications module being communicatively coupled to the impulse purchase prompt initiator. The signal is indicative of the impulse purchase request transmitted in response to the impulse purchase prompt. In some embodiments, the at least one storage compartment is temperature controlled so as to lower a temperature of the product, and wherein the impulse purchase prompt is only automatically transmitted in response to the temperature of the product being equal to or less than a predetermined temperature.

In some embodiments, the detection of the position of the customer is executed via at least one of a Bluetooth connection, a geofence detection, a wireless connection, or a camera detection. In some embodiments, the impulse purchase prompt initiator automatically transmits the impulse purchase prompt to the customer in advance of the customer arriving at the pickup location.

In some embodiments, the method further includes automatically opening the at least one storage compartment and dispensing a product associated with the impulse purchase request prior to arrival of the customer or a fulfilment associate at the automated locker. The automatic sending of the signal to the communications module of the automated locker automatically causes the at least one storage compartment to open and dispense the product prior to arrival of the customer or a fulfilment associate at the automated locker.

In some embodiments, the at least one storage compartment includes a first storage compartment and a second storage compartment, the first storage compartment having a first internal temperature that is lower than a second internal temperature of the second storage compartment, and the method further includes adjusting the first internal temperature and the second internal temperature in response to seasonal changes in impulse purchasing behavior of customers.

In some embodiments, the at least one storage compartment includes a single location of interaction which includes a dispensing location at which a product associated with the impulse purchase request is dispensed and a QR code scanning location.

In some embodiments, the method further includes, in response to the impulse purchase request being transmitted by the customer in response to the impulse purchase prompt, automatically transmitting, via the impulse purchase prompt initiator, a further impulse purchase prompt to the customer that is related to the product associated with the impulse purchase request. In some embodiments, the detection of the customer comprises an interaction with a mobile device associated with the customer.

According to a further aspect of the present disclosure, a system for implementing impulse purchase fulfillment includes at least one impulse purchase prompt and at least one fulfillment method. Specifically, the at least one impulse purchase prompt is automatically transmitted to a customer located at an impulse purchase location including a pickup location, the automatic transmission being carried out via an impulse purchase prompt initiator in response to the position of the customer being located at a predetermined distance away from the pickup location and in advance of the customer arriving at the pickup location, the impulse purchase prompt initiator including a processor and configured to detect a position of the customer via at least one of a Bluetooth connection, a geofence detection, a wireless connection, or a camera detection. Activation of the at least one impulse purchase prompt by the customer is detectable by the system.

The at least one fulfillment method of at least one product associated with the at least one impulse purchase prompt is carried out in response to an impulse purchase request transmitted by the customer in response to the impulse purchase prompt. Access to the at least one product is facilitated by the at least one fulfillment method dependent upon features of the impulse purchase location and the at least one impulse purchase prompt. In some embodiments, the at least one fulfillment method comprises automatically sending a signal to a communications module of an automated locker including at least one storage compartment, the communications module being communicatively coupled to the impulse purchase prompt initiator. The signal is indicative of the impulse purchase request transmitted in response to the impulse purchase prompt and automatically opening the at least one storage compartment and dispensing the at least one product prior to arrival of the customer or a fulfilment associate at the automated locker. The automatic sending of the signal to the communications module of the automated locker automatically causes the at least one storage compartment to open and dispense the product prior to arrival of the customer or a fulfilment associate at the automated locker. In some embodiments, the at least one storage compartment is temperature controlled so as to lower a temperature of the product, and the impulse purchase prompt is only automatically transmitted in response to the temperature of the product being equal to or less than a predetermined temperature.

Other aspects and advantages of the present invention will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3 illustrates an exemplary semi-automated locker of the impulse purchase prompting system of FIG. 2;

FIG. 10B illustrates another example of a mobile device interfacing with an exemplary impulse purchase prompting system and method, including a customer notification; and FIG. 11 illustrates a network supporting and implementing an exemplary impulse purchase prompting system and method.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 1:
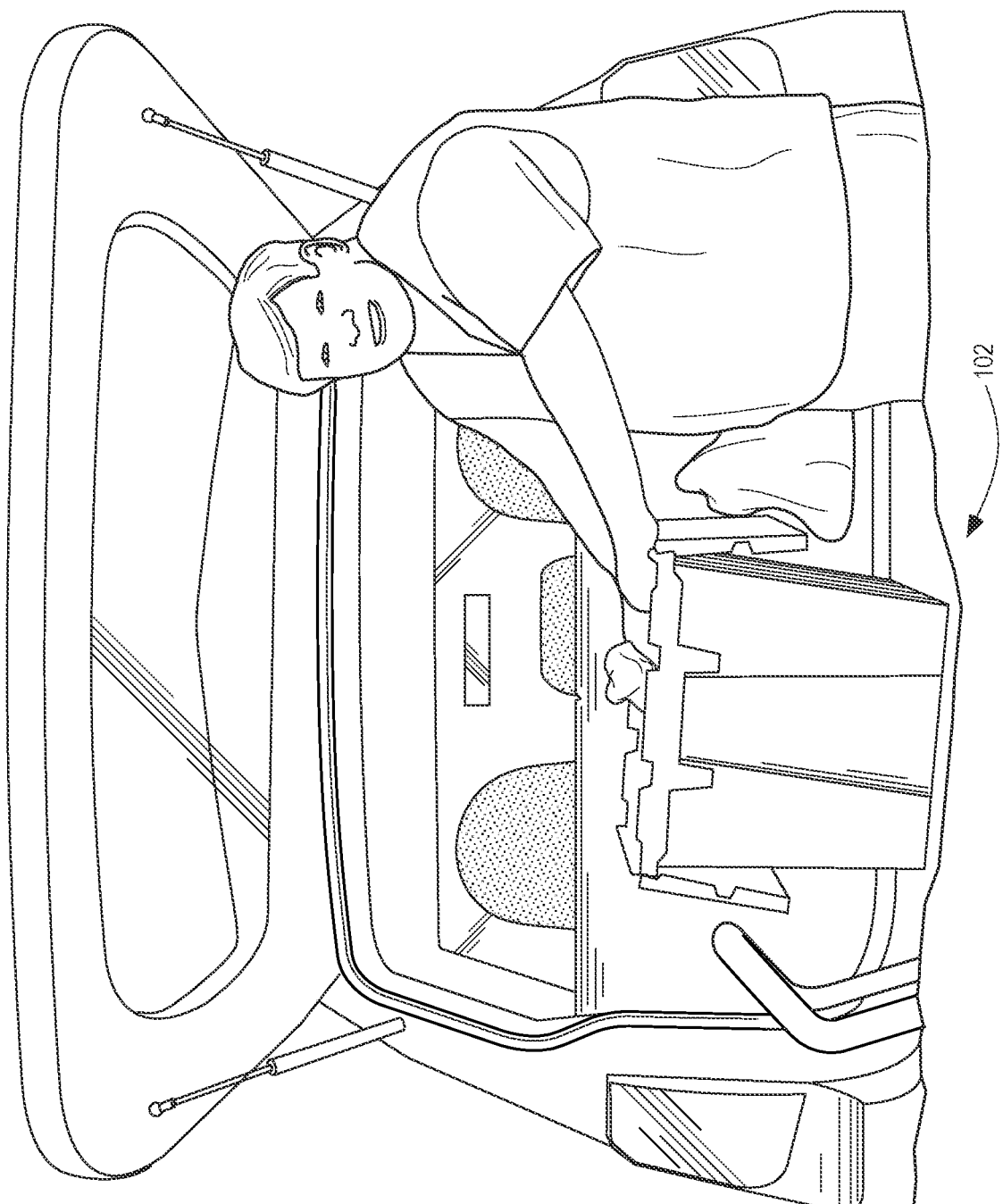
FIG. 1 depicts an exemplary grocery store pick-up operation.

Generally, the present disclosure details, with reference to FIGS. 1-11, a system and method 100 for prompting impulse purchases from consumers during a grocery store pick-up order and fulfillment of the prompted impulse purchase. In FIG. 1, an exemplary online purchase pick-up 102 is illustrated as a grocery store pick-up. For ease of description, the described system and method may refer to a grocery store pick-up; however, it is contemplated and one of skill will appreciate that the described system and method will be applicable to any type of retail, such as but not limited to fast food, fuel, clothing, hardware, convenience store sundries, pharmacies, restaurants, liquor, etc.

Online ordering, often times through a mobile application, has become ubiquitous in the grocery, supermarket, and other retail environments. As shown in FIG. 1, in example embodiments, when the online purchase pick-up 102 is fulfilled a customer drives a personal vehicle to a pick-up or loading area 104 (see FIGS. 2 and 9). A fulfillment service provider, e.g., an employee, contractor, or fulfillment associate, loads a pre-determined pick-up order 106 into a personal vehicle of the user. Alternatively, it is contemplated that in all instances where a fulfillment service provider is described, such actions could be taken by the customer. In other words, in appropriate situations, the customer may self-fulfill their online purchase.

Figure 10A:
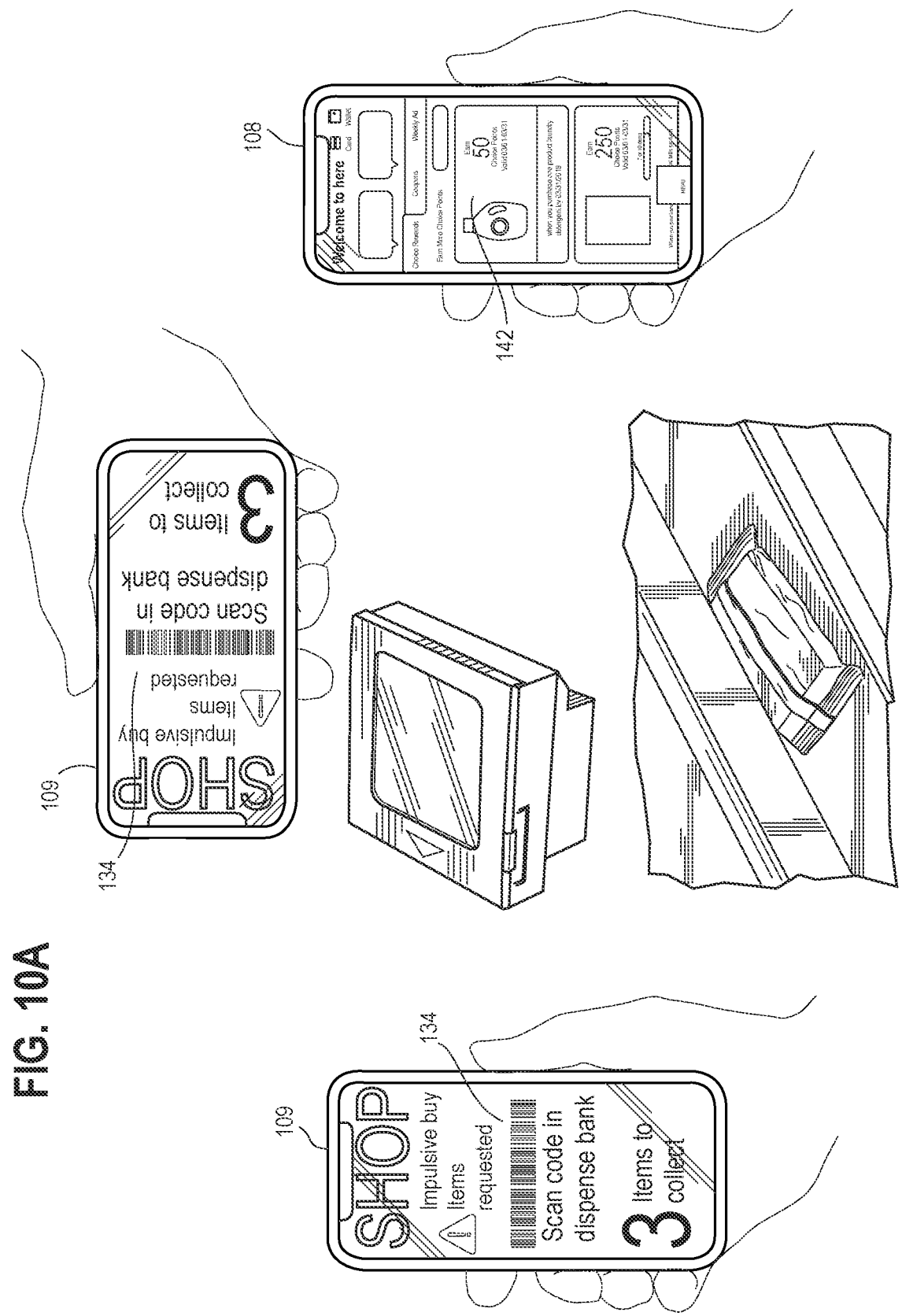
FIG. 10A illustrates operation of a customer mobile device and a mobile device of a fulfillment associate interfacing with an exemplary impulse purchase prompting system and method.

As mentioned previously, impulse purchases are often profitable for both retailers and product manufacturers/suppliers. Furthermore, customers retrieving an online purchase, such as a grocery pick-up, may still be open to impulse purchases. However, even though an impulse purchase may still be appealing to a customer completing an online purchase pick-up, such a customer may still not desire to enter the retail establishment or wait for a period of time that exceeds the duration of the pick-up/loading activity. Also, to spur the consumer to act, it may be desirable to prompt the customer to make an impulse purchase by some trigger causing the impulse purchase reaction. Conventionally, checkout displays of candy, snacks, batteries, toys, gum, beverages, gift cards, stamps, and/or other immediately available products prompt impulse purchases from customers waiting in line or traversing the checkout area. Referring ahead to FIGS. 10A and 10B, in order to prompt impulse purchases from a customer conducting an online purchase pick-up, an exemplary embodiment of the system for prompting impulse purchases 100 incorporates user detection/identification and presents one or more impulse purchase triggers/prompts 122 to a mobile device 108 of a user/customer (see also FIGS. 10A and 10B).

Figure 2A:
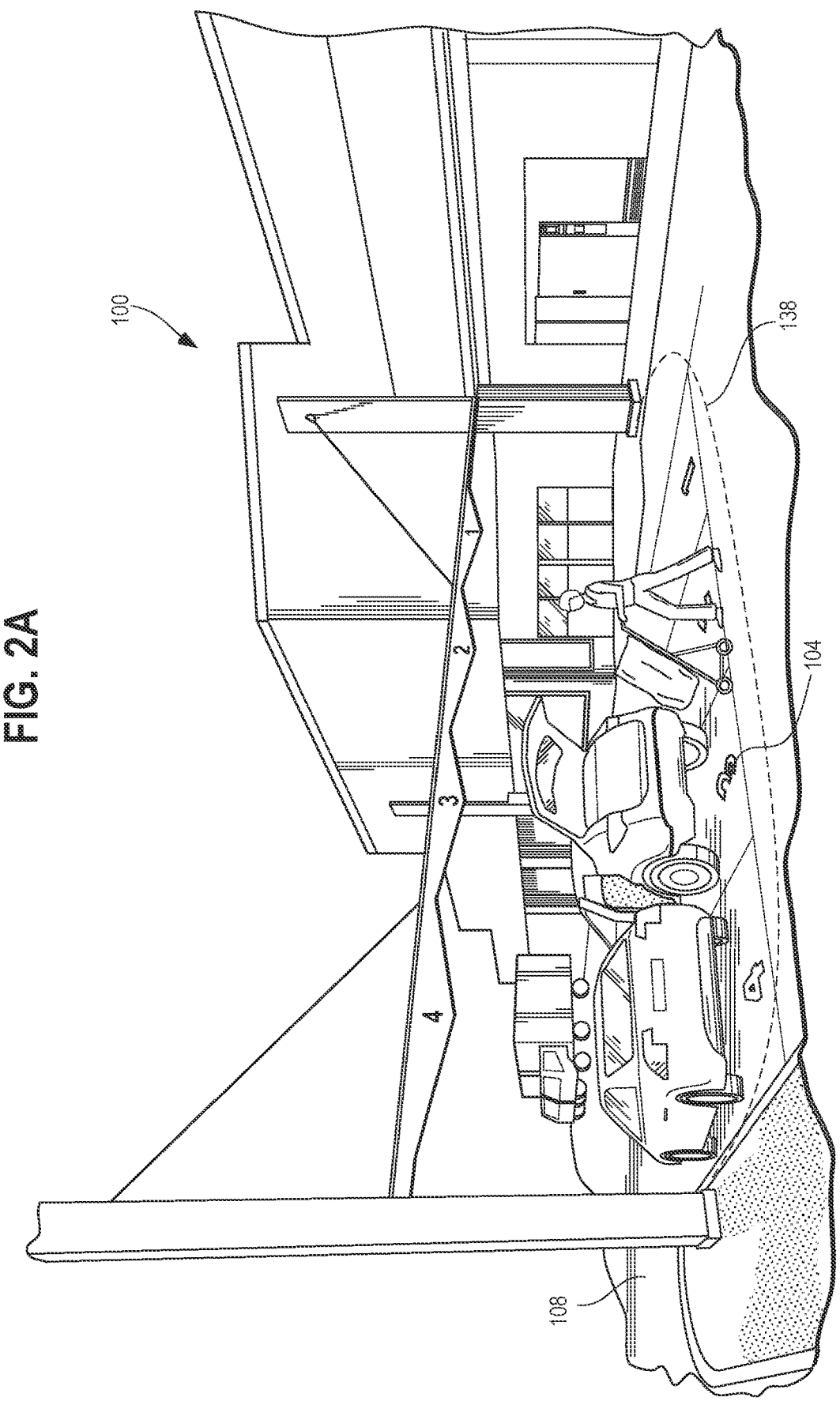
FIG. 2A illustrates an exemplary grocery store pick-up operation with an exemplary impulse purchase prompting system and method incorporated therein.

Referring now to FIG. 2A, a grocery store pick-up operation is shown with an exemplary impulse purchase prompting system 100 incorporated therein. Customers conducting an online purchase pick-up may not be willing to wait for a fulfillment associate to re-enter the proximal retail establishment to retrieve impulse purchase products, even if the customer would otherwise be open to an impulse purchase. Therefore, easy and quick availability of an impulse purchase is an important factor in improving the likelihood that an online purchase pick-up customer will complete an impulse purchase. Additionally, the timely retrieval of a product selected from an impulse purchase prompt may be important logistically for high-throughput pick-up operations and/or those retail establishments with limited space for conducting online purchase pick-up and/or loading, e.g., it is important that customers making an impulse purchase are not delayed such that a line forms or lengthens for the pick-up operation or in the surrounding areas.

Figure 2B:
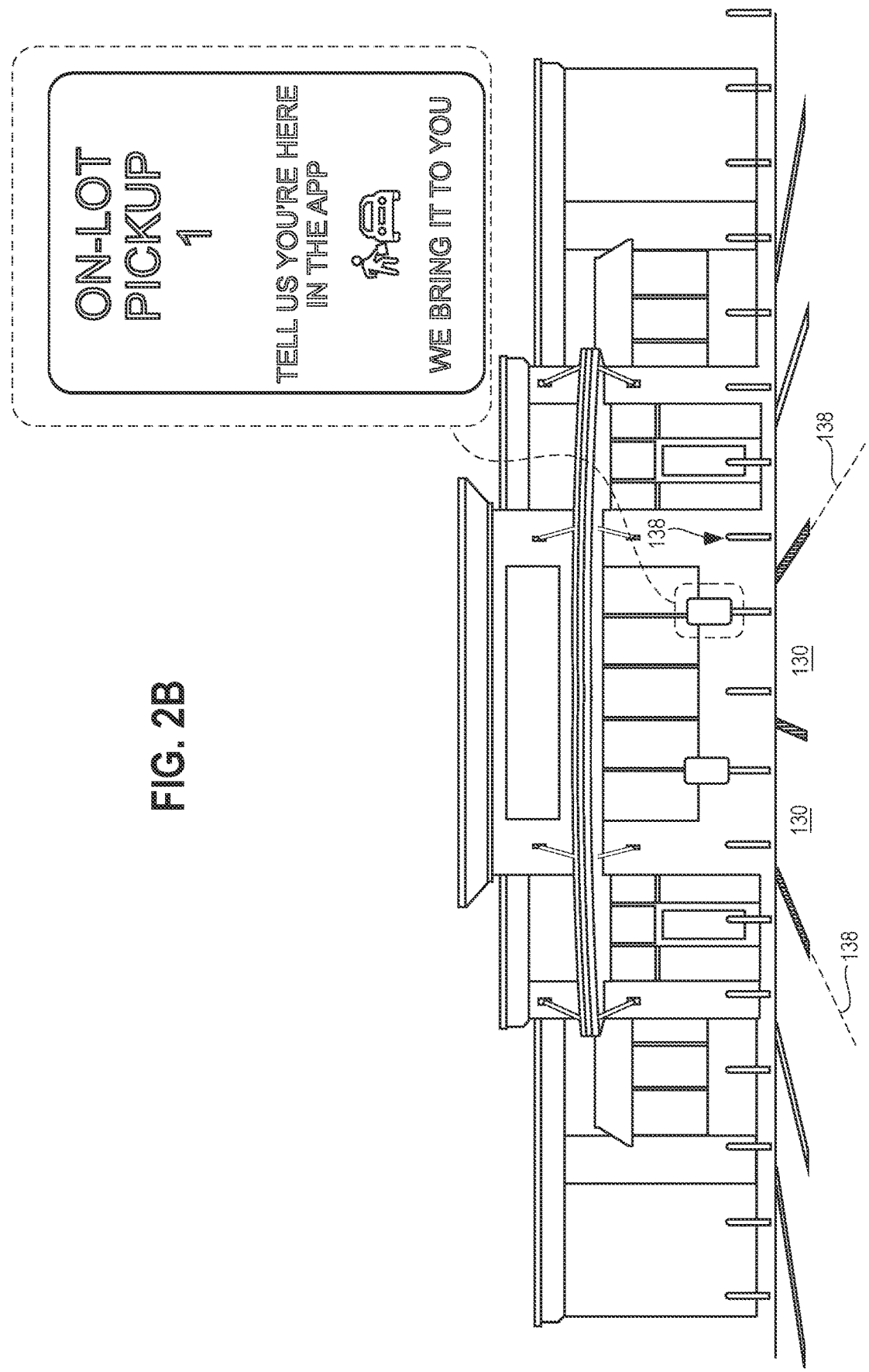
FIG. 2B illustrates an exemplary store front pick-up parking environment suitable for an exemplary impulse purchase prompting system and method.

FIG. 2B illustrates an exemplary store front pick-up parking impulse prompt location with the impulse purchase prompting system and method 100 incorporated therein. In this example, a customer may enter one of a plurality of parking spots 130 designated for facilitating pick-up of products, food, and/or other goods. These designated pick-up spots 130 may facilitate a customer picking-up goods from a pick-up window, kiosk, or another remote or contactless pick-up fulfillment solution. Alternatively, a fulfillment associate may provide pick-up service to the designated pick-up spots 130.

Figure 2C:
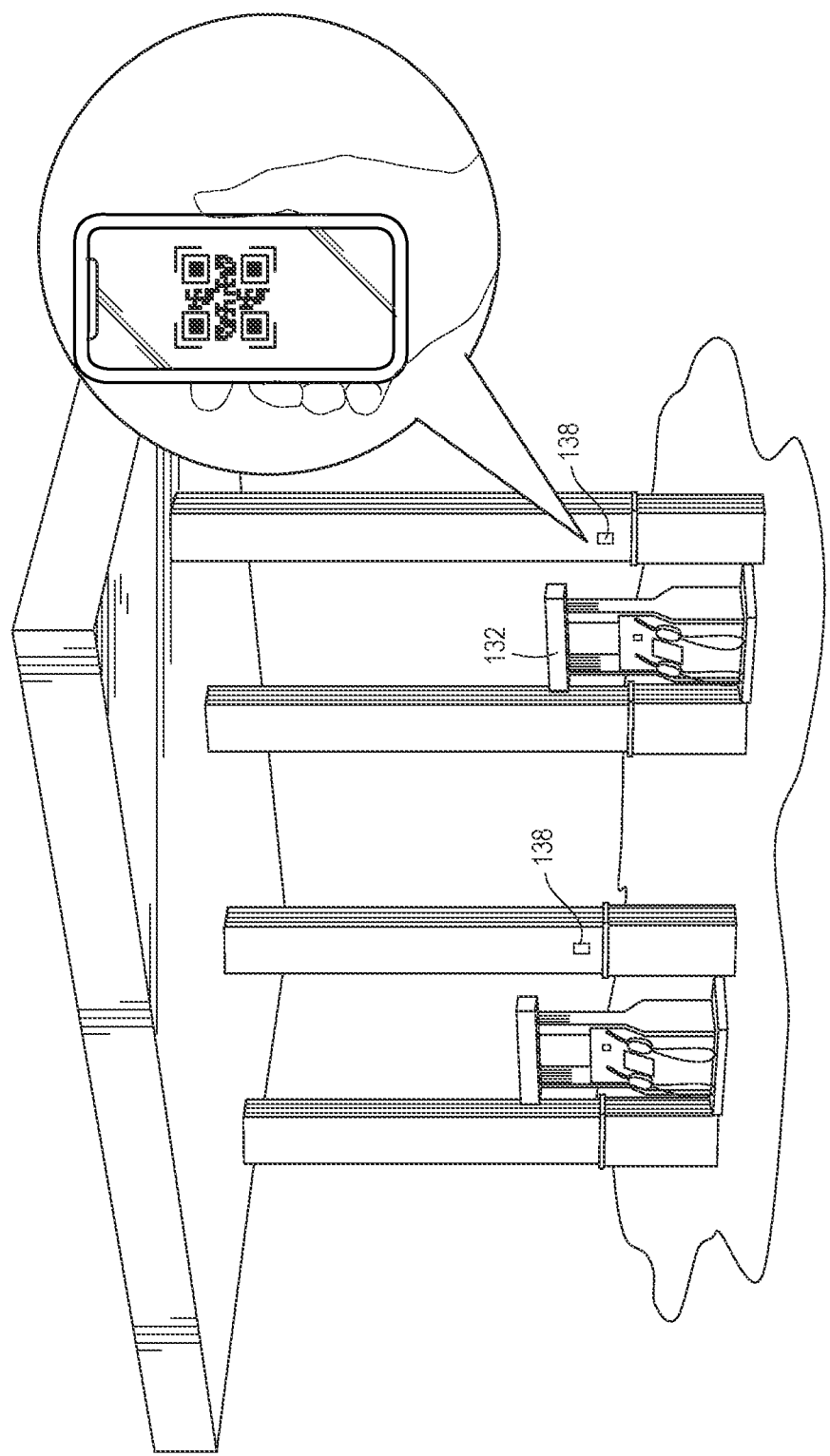
FIG. 2C illustrates an exemplary fuel pump island environment suitable for an exemplary impulse purchase prompting system and method.

Referring now to FIG. 2C, an exemplary fuel pump island impulse prompt location incorporates an example of the impulse purchase prompting system and method 100. In this example, customers that intend to complete a transaction at a fuel pump island 132 may be presented with an impulse purchase prompt. A fulfillment associate may, upon receipt of an impulse purchase request 134 (see FIG. 10A), deliver an impulse purchased item to the indicated fuel pump island 132. Alternatively, a customer may select to pick up the impulse purchase selection from a nearby locker, kiosk, or another suitable fulfillment solution.

To initiate an impulse purchase prompt, one or more QR codes, or another suitable information carrier 140, may be displayed on or near the fuel pump island 132. For example, screens incorporated into fuel pumps may display the customized QR codes 140 and impulse purchase prompt messages to solicit customer interaction with the QR code 140. Upon scanning of the QR code 140, a customer may be presented with an impulse purchase prompt in the form of a notification on the mobile device 108 associated with the particular customer. Alternatively, geofencing, Bluetooth™ beacons, and/or another suitable customer detection feature 138 may be used to identify entry of a customer vehicle within the space proximal the fuel pump island 132. Once identified, an impulse purchase prompt 122 (see FIGS. 9, 10A, and 10B) may be delivered to the mobile device 108 associated with the customer and/or to a computing resource within the vehicle such as an infotainment system. In examples, the customer detection feature 138 may detect the presence of one or more customers by interacting with the mobile device 108 associated with each customer. For example, a communications protocol handshake between a wireless network, such as a retailer network, and the mobile device 108 may serve to identify the presence of a customer. Alternatively, GPS and/or location information, such as may be relevant for triggering a geofence, may be transmitted from a cellular network carrier, or the like, to a retailer network with or without establishing a network connection between a retailer network and the mobile device 108 of a customer.

Figure 2D:
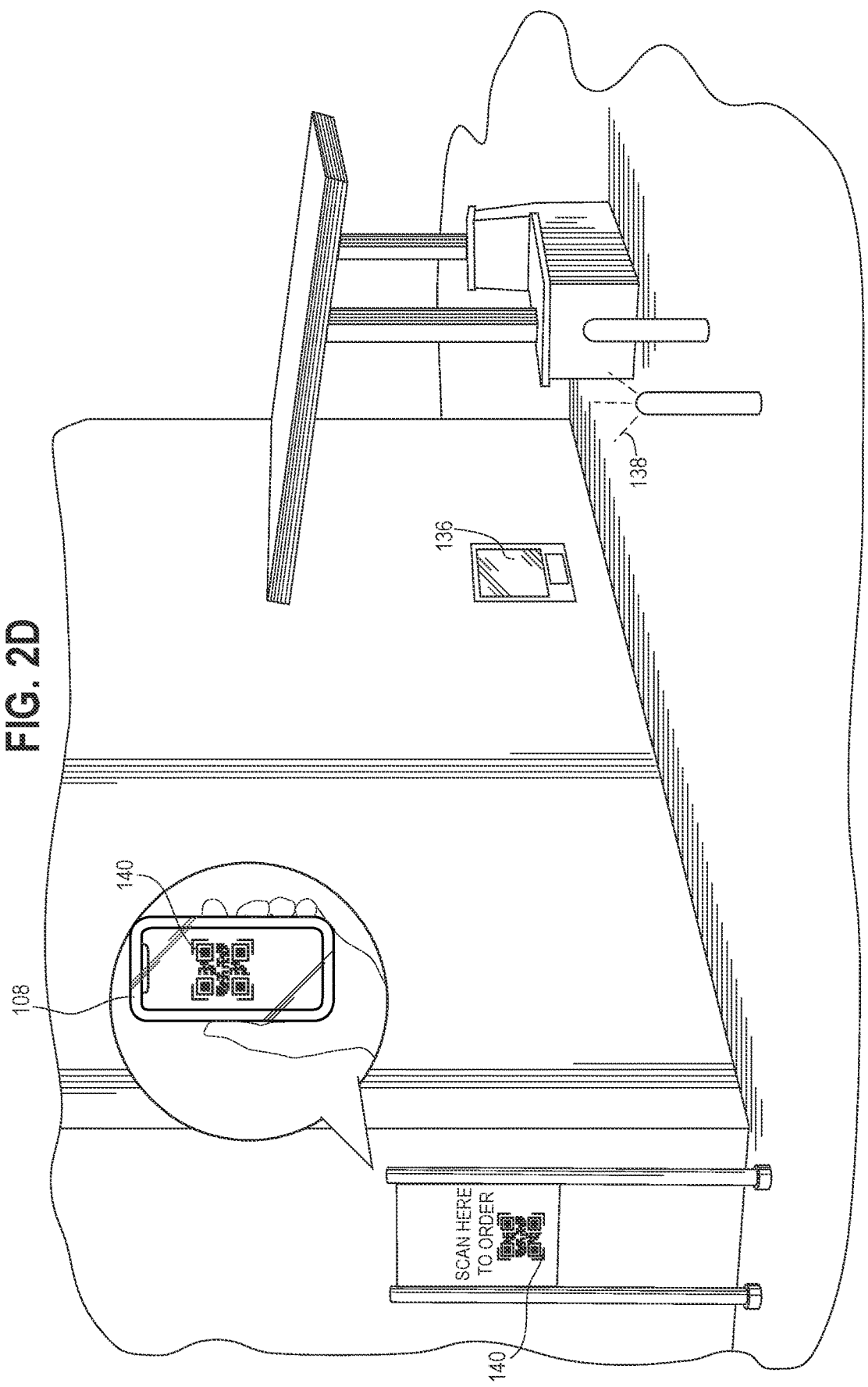
FIG. 2D illustrates an exemplary drive-through window environment suitable for an exemplary impulse purchase prompting system and method.
Figure 2E:
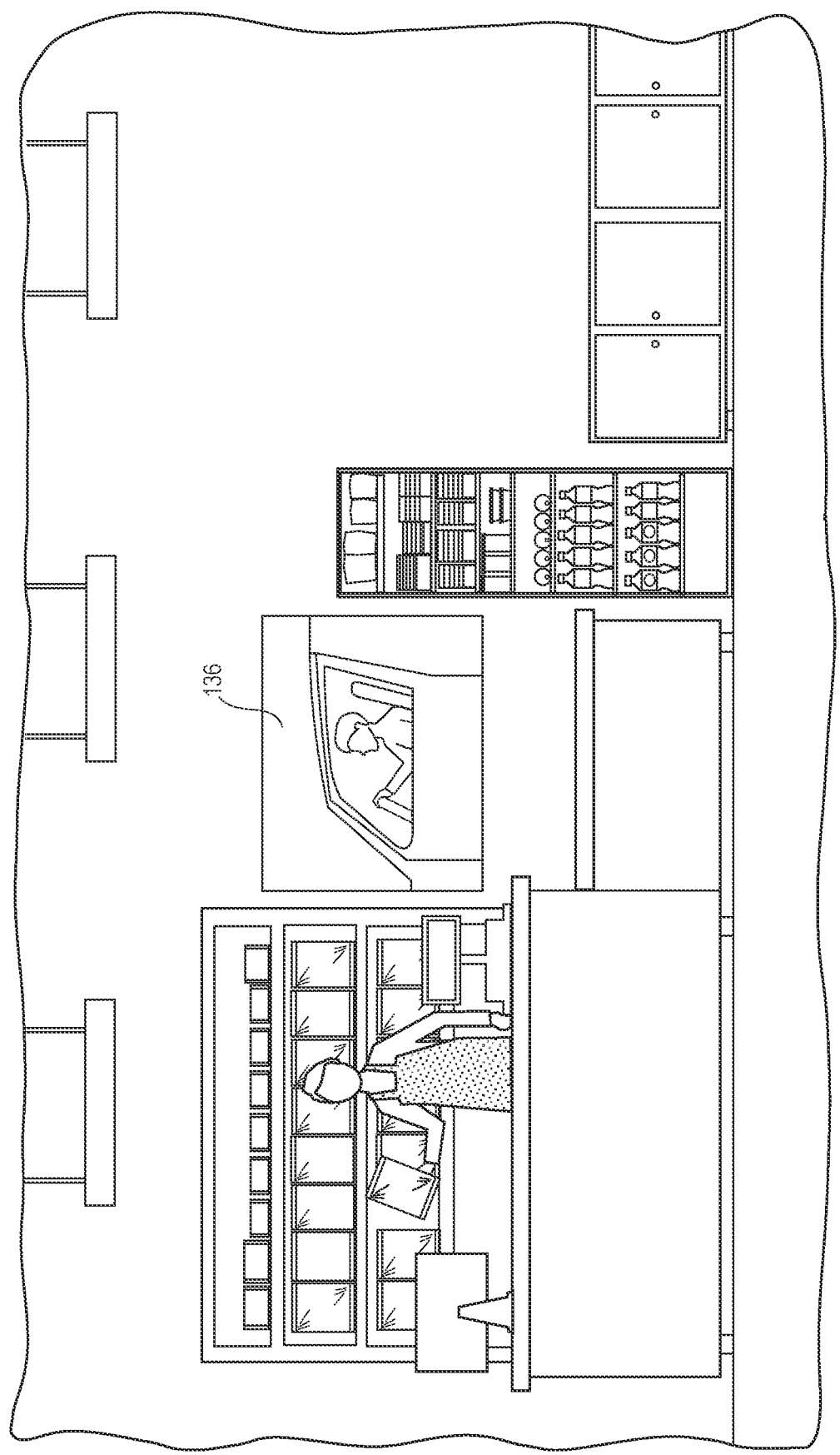
FIG. 2E illustrates an exemplary drive-through window fulfillment system suitable for an exemplary impulse purchase prompting system and method.

FIG. 2D illustrates an exemplary drive-through window impulse prompt location suitable for incorporating the impulse purchase prompting system and method 100. The drive-through window 136 may be configured such that one or more Bluetooth™ beacons or geofence boundaries are present a certain distance ahead of the drive-through window 136. Accordingly, an interaction with the mobile device 108 associated with a customer may be initiated before the customer reaches the drive-through window, e.g., while waiting in a vehicle queue. Before reaching the drive-through window 136, the impulse purchase prompt 122 may be transmitted for notification to a customer preferably while the example customer waits in line or at the drive-through window 136 for a reasonable period of time for the customer to submit the impulse purchase request 134. A fulfillment associate stationed inside the drive-through window may receive the impulse purchase request 134, as depicted in FIGS. 2E and 10A. The fulfillment associate, upon receipt of the impulse purchase request 134, may retrieve requested items from a fulfillment solution as configured in FIG. 2E. Alternatively, lockers shown in FIGS. 3-8 may be accessed by the fulfillment associate or the customer to complete the impulse purchase request 134.

Figure 4:
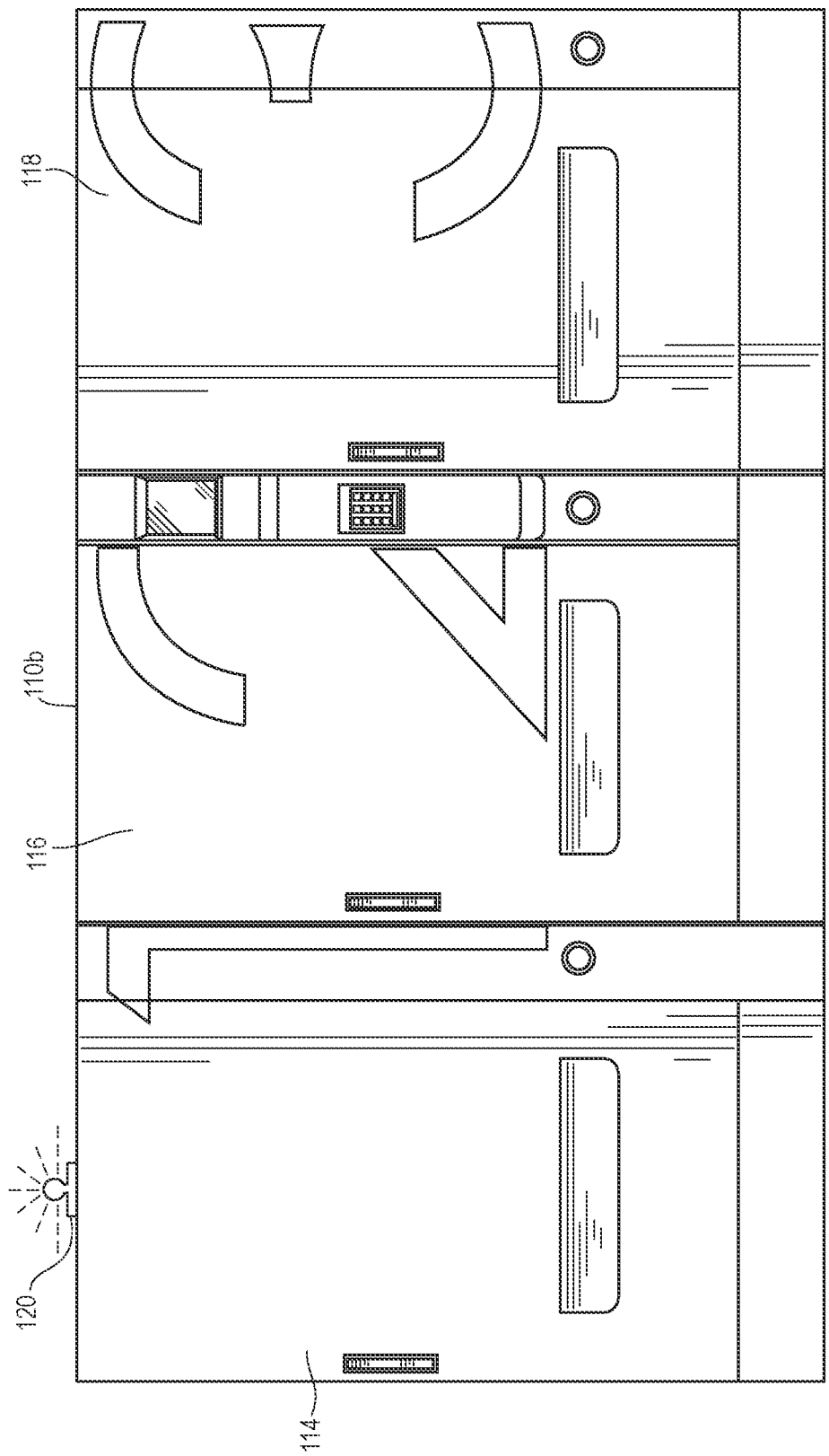
FIG. 4 illustrates an exemplary fully-automated locker of an impulse purchase prompting system.

The impulse purchase prompting system 100 may include one or more semi-automated lockers 110a (see FIG. 3) and/or one or more fully automated lockers 110b (see FIG. 4). The locker(s) may be at any suitable location and, in some instances, may be located near the loading area 104. The lockers 110a and/or 110b may be stocked with a curated selection of impulse purchase products 112 coordinated to match the one or more impulse purchase triggers 122 presented to the mobile device 108 of the customers passing through or near the loading area 104. Referring to FIG. 3, the semi-automated locker 110a comprises three compartments, although more or fewer compartments are also contemplated as desired by a retail establishment and depending on space constraints of the loading area 104. The three compartments comprise an ambient compartment 114, a light cooling compartment 116, and a full-cooling beverage compartment 118. In the example of FIGS. 2 and 3, the semi-automated locker 110a has a non-consumer facing design and may be mounted outdoors, proximal the loading area 104. Of course, it is contemplated that the semi-automated locker 110a may have a consumer facing design. In either instance, the semi-automated lockers 110a are disposed near enough to the loading area 110a that the customer or a fulfillment associate assisting with loading and/or monitoring the loading area 104, may quickly retrieve the impulse purchase products 112 in response to customer selection (or activation) of the one or more impulse purchase triggers 122. In some instances, the semi-automated lockers 110a are located in a manner so that entry into the retail establishment is not required. The design of the semi-automated lockers 110a may provide security and environmental advantages while still facilitating near-real time fulfillment of impulse purchases (e.g., from instantaneous to about 1, 2, 3, 4, 5, 6, 7, 8, 9, or about 10 minutes).

For additional convenience, it is contemplated that the customer will be presented with options and the ability to select one or more products other than those presented by the one or more impulse purchase triggers or prompts 122. This can be accomplished in several ways, one of which is to present a menu screen 142 (see FIGS. 10A and 10B) of available products upon interaction by the customer with the one or more impulse purchase triggers 122, as shown in FIG. 10A. In any event, any manner of presenting the products available for impulse purchasing is contemplated. Still further, the impulse purchase triggers 122 may be product specific (e.g., Pepsi™), product line specific (e.g., a cola), generic (e.g., "Anything for the ride home"), and/or customer targeted (e.g., "Your pick-up order contains an electric toothbrush, do you need batteries for that?"). The impulse purchase triggers 122 may present any number of quick-purchase virtual buttons. The impulse purchase trigger 122 may interface with one or more other payment-authorized applications (e.g., Google Wallet™, Apple Pay™, Walmart™ mobile application, or a number of other suitable examples) available on the mobile device 108 to facilitate quick authorization of payment for the impulse purchase without necessitating an additional transaction at the retail establishment (i.e., without requiring a card swipe or cash payment). Additionally, a payment solution may be integrated with a mobile interface presented to a fulfillment associate when responding to the impulse purchase request 134 (see again FIG. 10A). In contemplated examples, a fulfillment associate may be able to confirm payment, verify payment, request payment, and/or notify a customer of a price change. Alternatively, a fulfillment associate may be able to otherwise interact with a customer, such as to suggest an item substitution or notify the customer of delivery/pick-up details (e.g., a fulfillment associate may confirm the fuel pump island 132 designated for delivery).

Additionally, the impulse purchase triggers 122 may be correlated with the available inventory in the lockers 110a, 110b, and/or the specific products presented in response to a customer-activated one of the impulse purchase triggers 122 may be more directly correlated with the available inventory (i.e., low inventory of one cola may not prevent presentation of a cola or beverage related prompt, but it may mean that only available colas are presented in response to customer engagement with the prompt). This disclosure contemplates that engagement by a customer with a first of the impulse purchase triggers 122 may be followed-up by presentation of another impulse purchase trigger. For example, if a customer activates an impulse purchase trigger for a package of Lays™ potato chips, then a follow-up impulse purchase trigger for a beverage may be desirable a short time after (or nearly simultaneously with) activation of the original impulse purchase trigger. In other examples, the impulse purchase triggers 122 may be associated with other data collectible from the mobile device 108, the impulse purchase location, and/or relevant source. The impulse purchase triggers or prompts 122 may be initiated or customized as a result of weather information, current temperature, news information, date, time of day, a customer's present order or shopping list, and/or other suitable sources of information. For example, the impulse purchase trigger 122 may prompt a customer to purchase a sports drink when weather information indicates high temperatures. Further, the impulse purchase trigger 122 may suggest a coffee and/or breakfast impulse purchase when, for example, the mobile device 108 of a customer interacts with a geofence around one of the fuel pump islands 132 between the hours of 5:00 A.M. and 8:00 A.M.

In an example embodiment utilizing the semi-automated locker(s) 110a, selection of one or more products or the activation of one of the impulse purchase triggers 122 sends a signal to a communication module 120 of the semi-automated locker(s) 110a. The communication module 120 may comprise a network connection, an RF receiver/transmitter, and/or other suitable communications equipment capable of receiving a message from a user mobile device and/or a mobile or other communications network (e.g., a Bluetooth connection, 4G or 5G network, Wi-Fi). When a signal is received by the semi-automated locker(s) 110a, the locker 110a may open the appropriate one of the three compartments 114, 116, 118, in anticipation of the customer or a fulfillment associate arriving to retrieve the selected or impulse purchase products 112. Only the correct/necessary compartments 114, 116, 118 open to provide access for the customer or the fulfillment associate when an impulse purchase is being fulfilled.

Figure 5:
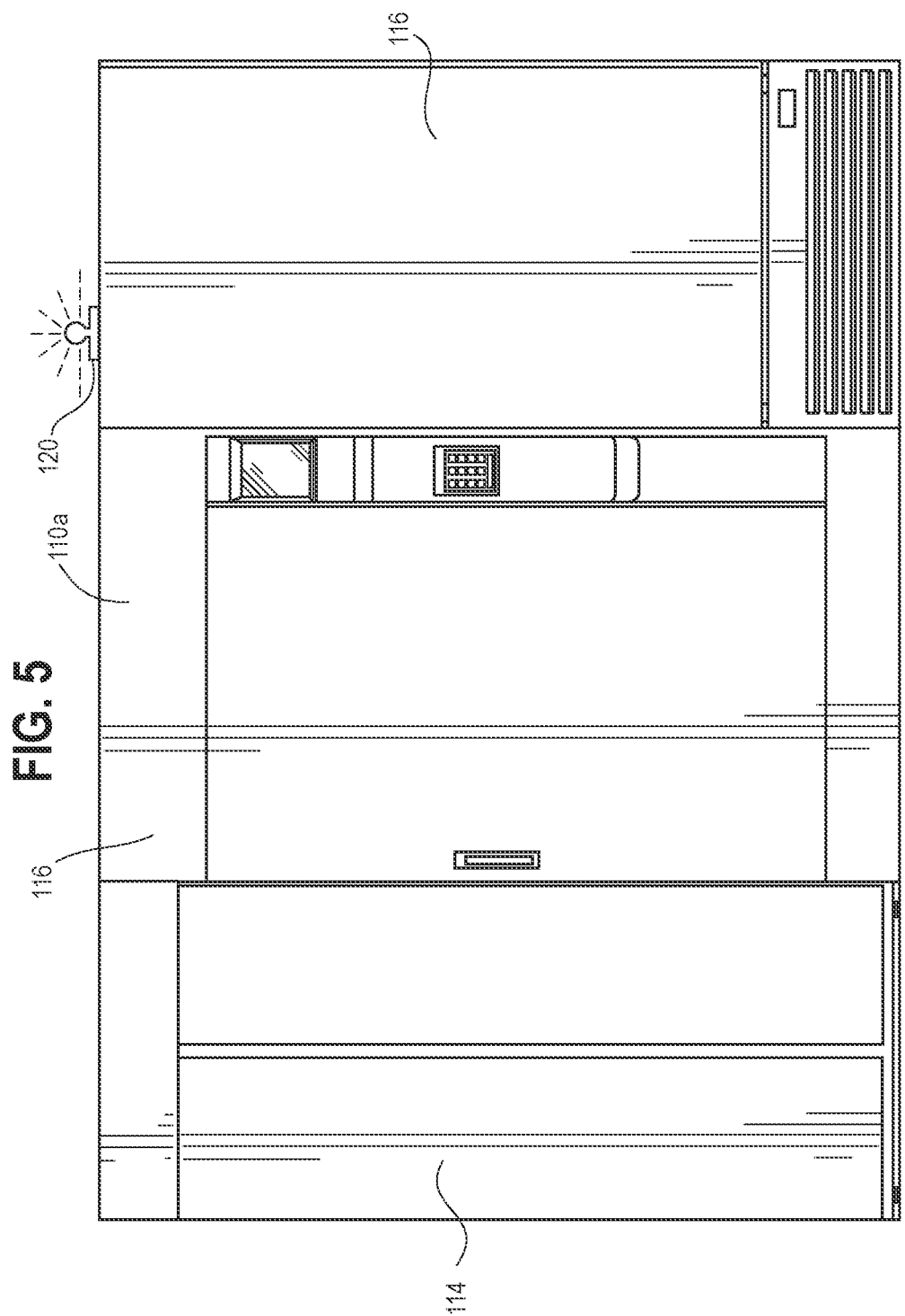
FIGS. 5 and 6 further illustrate features and operation of the exemplary semi-automated locker of an impulse purchase prompting system.
Figure 6:
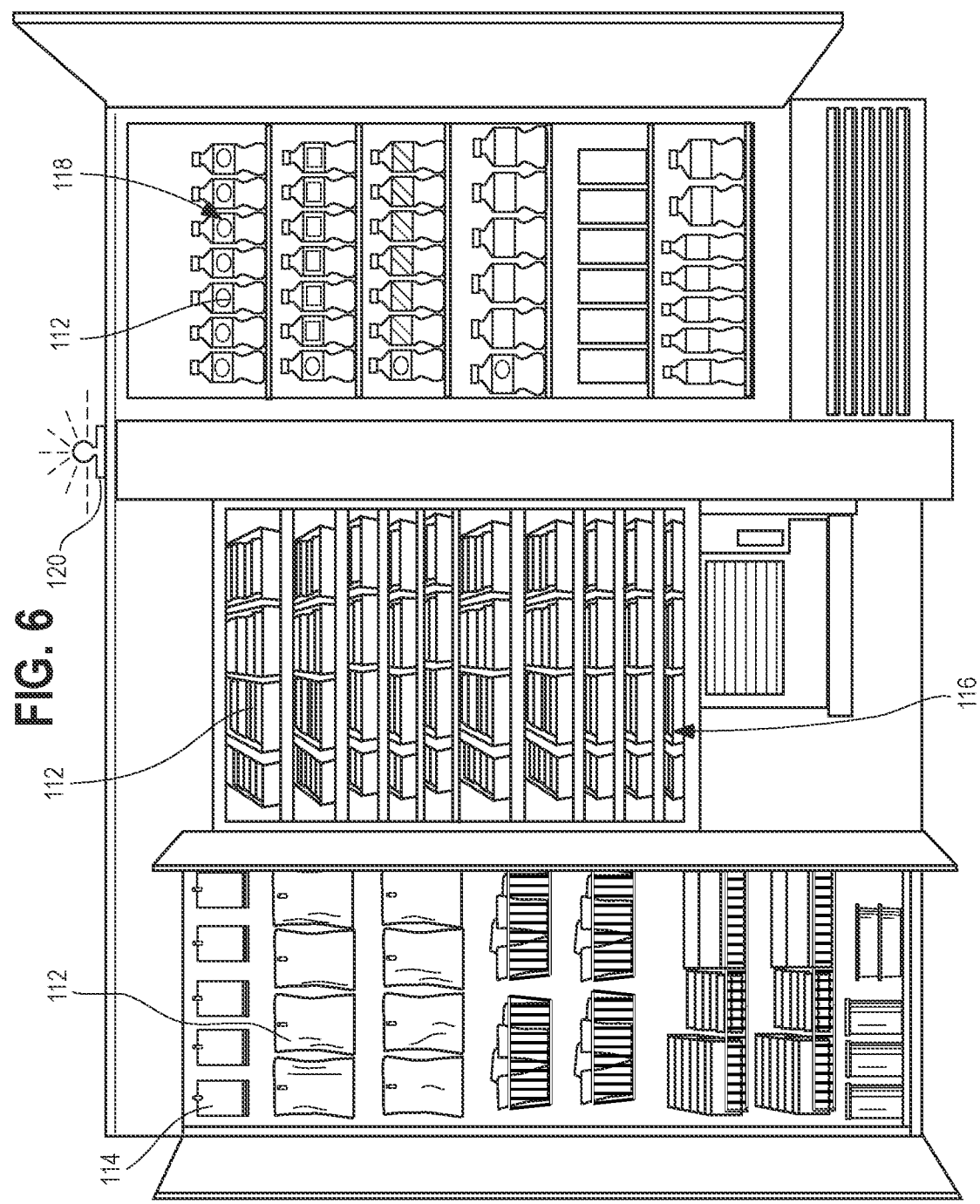

Referring ahead to FIGS. 5 and 6, further features and operation of the semi-automated lockers 110a are illustrated. In some embodiments, the semi-automated lockers 110a include a two-column locker with internal shelving. Additionally, the light-cooling compartment 116 may include a refrigerator that chills temperature sensitive products. Further, the full-cooling compartment 118 may comprise a commercial beverage cooler with a retrofit blind locking door. As shown in FIG. 6, the internal storage of the semi-automated lockers 110a may be loaded according to a similar process to the stocking process in current front-end vending locations. One or more alerts may be created to handle out of stock and low stock occurrences and to coordinate same with both re-stocking and curation of the impulse purchase triggers 122 on offer to customers at a given time or in the future (e.g., an impulse purchase trigger for Diet Pepsi™ may not be presented to a customer if Diet Pepsi™ is not stocked or has not yet been cooled to a temperature acceptable for individual sale).

Referring now to FIG. 4, an example is shown of the fully-automated lockers 110b for use as part of the impulse purchase prompting system 100. The fully-automated lockers 110b provide full automation of the three compartments 114, 116, 118 in a networked vending machine format. As with the semi-automated lockers 110a, the fully-automated lockers 110b may be constructed for mounting outdoors proximal a loading area 104. The fully-automated lockers 110b may operate in response to receipt of a message indicating that a customer has selected one or more products other than a product presented by the impulse purchase trigger 122. or has activated or selected one of the impulse purchase products 112 in response to the one or more impulse purchase triggers 122. The fully-automated lockers 110b dispense the selected one of the impulse purchase products 112 in anticipation of the customer or a fulfillment associate retrieving the product.

Figure 7:
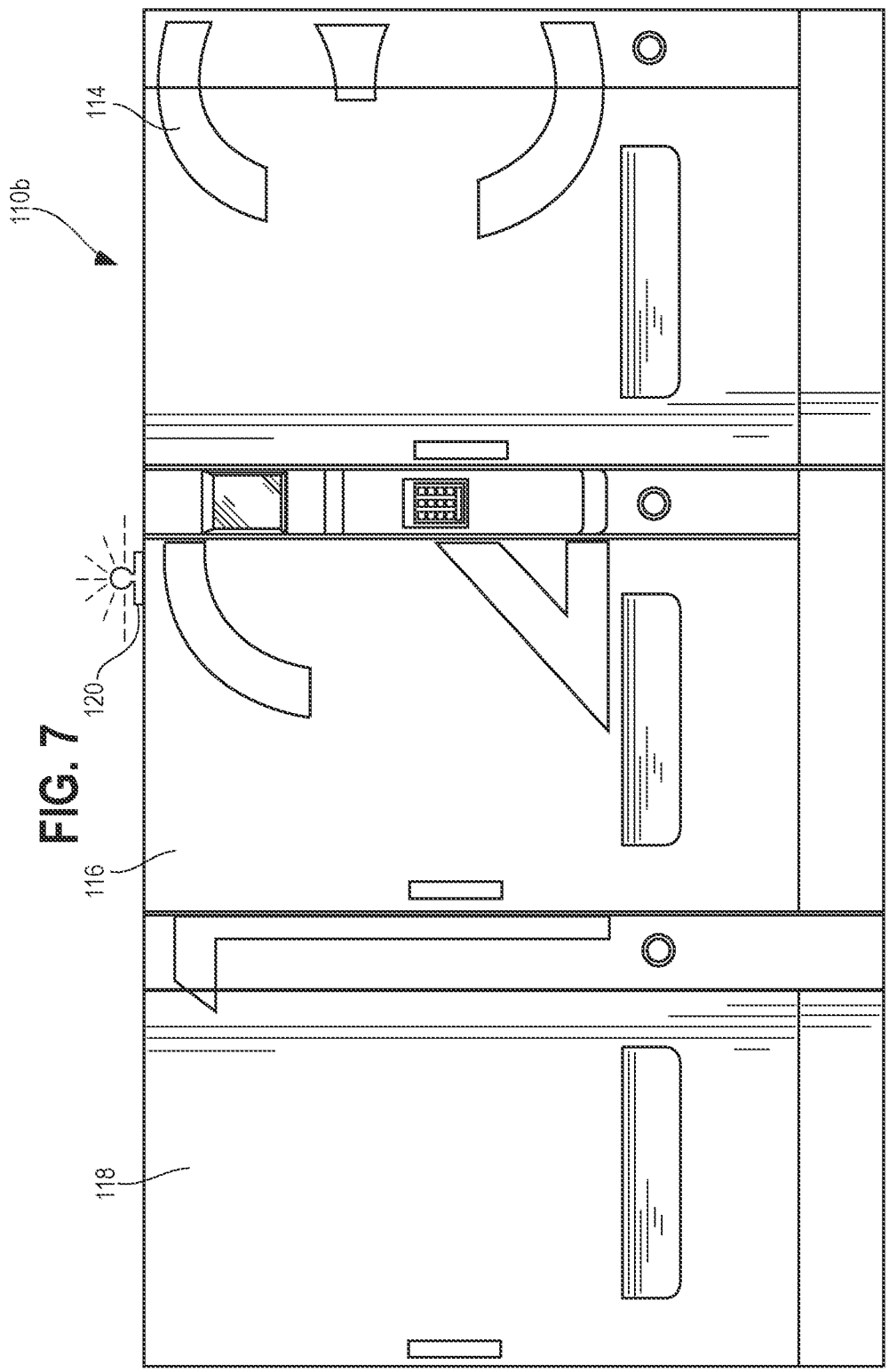
FIGS. 7 and 8 further illustrate features and operation of the exemplary fully-automated locker of an impulse purchase prompting system.
Figure 8:
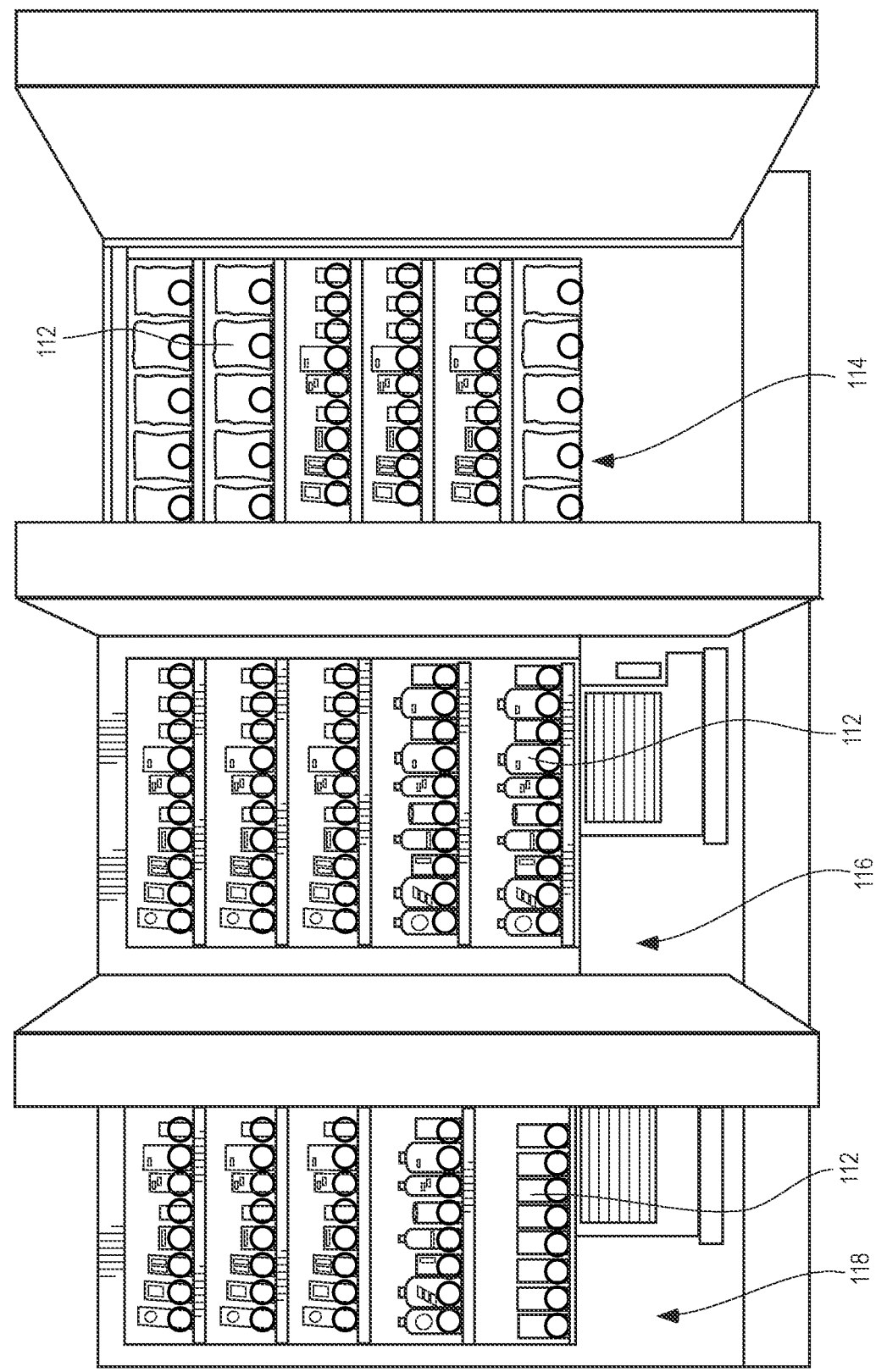

FIGS. 7 and 8 further illustrate features and operation of an example of the fully-automated lockers 110b. In some example embodiments, the fully-automated lockers 110b may leverage existing vending machine technology with a secure outer compartment. In a system utilizing the fully-automated lockers 110b, fulfillment may be more quickly and accurately completed because the customer or a fulfillment associate will not be required to find the impulse purchased product because it will have been dispensed automatically from a compartment indicated by an indicator light for easy identification by the customer or the fulfillment associate. The fully-automated lockers 110b may also utilize a single point of interaction (e.g., one dispensing location, one bar code scanning location, etc.) to further simplify interaction with the system for the customer or fulfillment associates. Additionally, the fully-automated lockers 110b may improve inventory control by tying each instance of product dispensing to individual customers or fulfillment associates. The embodiment of FIG. 8 may further facilitate flexing of storage areas between the climate-controlled compartments 116, 118 by increasing the refrigerated-to-chilled ratio (e.g., in response to seasonal changes in impulse purchasing behavior).

Figure 9:
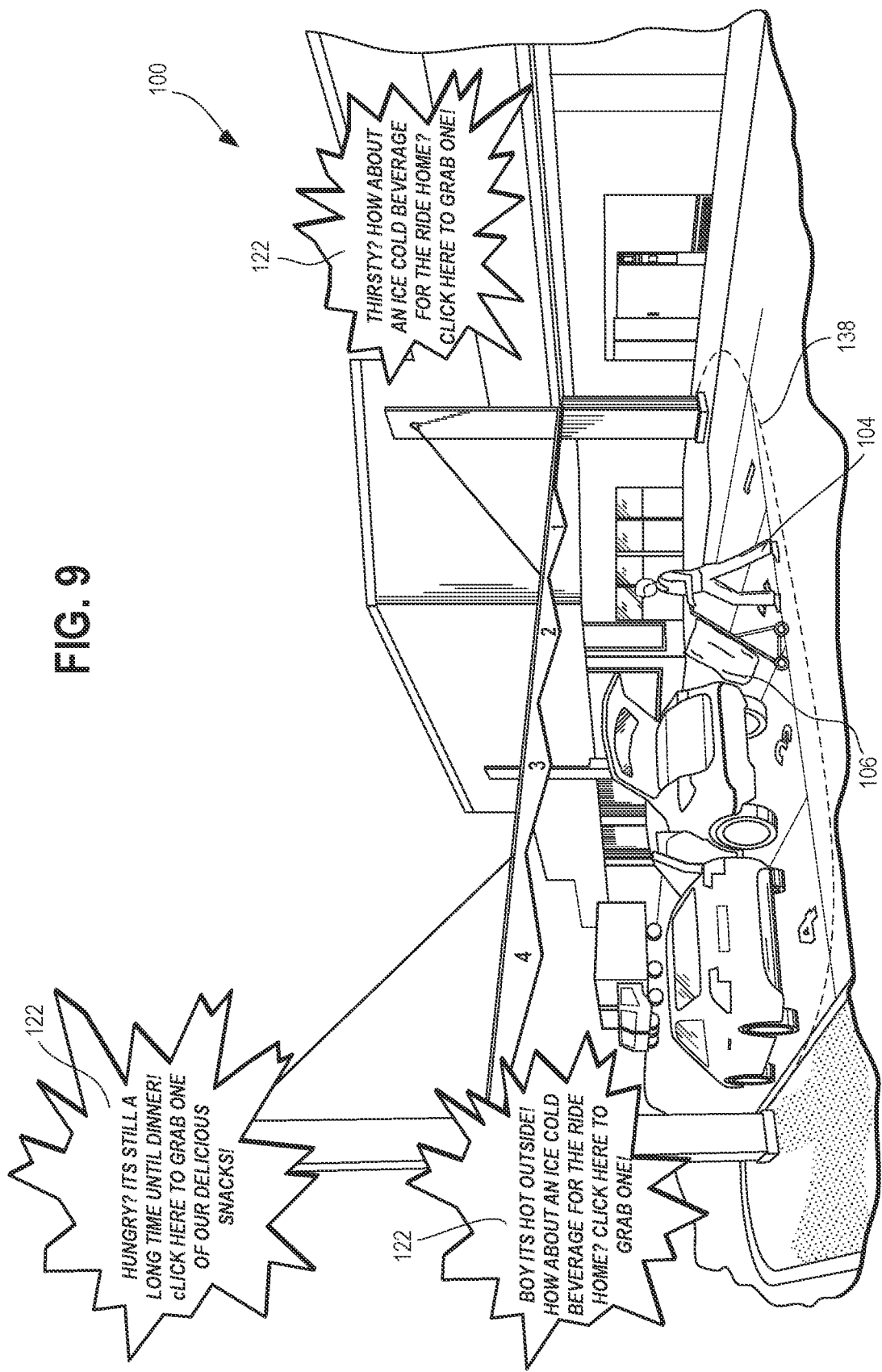
FIG. 9 is an illustration of an exemplary impulse purchase prompting system including location detection and exemplary mobile device prompts.

The example embodiment of FIG. 9 includes location detection and exemplary mobile device prompts of the system for prompting impulse purchases 100. In this example, geofencing, Bluetooth™ beacons, and/or other suitable location or customer detection equipment may be used to detect when a customer is a suitable target for transmission of one of the impulse purchase prompts or triggers 122. For example, after a customer arrives, but before a predetermined purchase is loaded into a vehicle of the customer, the customer is likely to be seated in their vehicle using a mobile device to check-in/confirm arrival so that loading of the predetermined online order may commence. During this period of mobile device engagement, a playful example of the mobile device impulse purchase prompt 122 may be delivered to the customer's mobile device. In example embodiments, the mobile device may be a tablet, mobile telephone, on- or in-dash mounted vehicle entertainment system, after-market device for use in a vehicle (such as an Amazon Alexa™ device or Garmin™ navigation device), and/or another suitable device capable of receiving the impulse purchase prompt 122. The impulse purchase prompts 122, as shown in FIG. 9, may be playful so as to increase the likelihood of customer engagement and completion of an impulse purchase transaction. Similarly, the impulse purchase prompt 122 may be transmitted to the mobile device 108 of a customer during other periods of mobile device engagement dependent upon a specific impulse purchase location. For example, customers often engage with a mobile device while waiting at the fuel pump island(s) 132 shown in FIG. 2C or while waiting in the store front parking spaces 130 illustrated in FIG. 2B. As a further example, customers often engage with a mobile device during waiting periods at a drive-through window 136, such as when waiting for fulfillment of a prescription or preparation of food. Geofences, Bluetooth™ beacons, and/or other suitable customer location detection hardware may be situated to detect when a customer arrives on the premises of the impulse purchase location and/or when a customer enters a period of likely engagement with an associated mobile device. For example, a Bluetooth™ beacon may be placed in bollards along a route of the drive-through window 136, that may demarcate the pick-up parking spaces 130, or that form the structure of the fuel pump islands 132. One customized one of the QR codes 140 may similarly be posted along such routes to further attract customer attention and cue transmission of the impulse purchase prompt(s) 122. In still other examples, the impulse purchase prompt 122 may prompt a customer to scan the QR code 140 and direct the customer to a location whereat the QR code 140 may be plainly visible and that also is suitable for a waiting period during which a customer may engage with the mobile device 108.

After a customer makes a product selection or activates or selects one of the impulse purchase prompts 122, a fulfillment associate may receive on another mobile device the impulse purchase request 134. The impulse purchase request 134 is a notification that a particular customer has requested to complete an impulse purchase. FIG. 10A illustrates operation of a mobile device 109 interfacing with the system for prompting impulse purchases 100 as utilized by a fulfillment associate. In this example, the mobile device 109 of a fulfillment associate receives a QR code, bar code, another suitable scannable code, or another suitable electronically transmissible key for accessing a particular compartment of the one or more lockers 110*a* or authorizing dispensing from the lockers 110*b*. Also, in examples of the system for prompting impulse purchases 100, the impulse purchase request 134 may provide one or more direction to a fulfillment associate, such as location of a product, delivery information, pick-up information, customer preferences, payment information, and/or timing information for the request. In example embodiments, the system for prompting impulse purchases 100 may be linked to retailer grocery picker applications (e.g., PeaPod, InstaCart, Whole Foods, Amazon, Albertson, Giant, etc.). Similarly, the impulse purchase prompts 122 may be delivered through already existing mobile applications for online grocery shopping and pick-up. In other examples, the mobile device 109 of a fulfillment associate may provide for further interaction with a customer, such as selection and transmission of additional instances of the impulse purchase prompts 122, dependent upon inventory, wait time, and/or other information readily available to a fulfillment associate. For instance, a fulfillment associate may observe that a certain variety of impulse purchase product has very recently sold out and suggest a similar variety as a replacement without requiring that a customer navigate further into a mobile ordering application. Referring to FIG. 10B, an example notification format of the impulse purchase prompt 122 is delivered to the mobile device 108 of a customer and requests a customer interaction.

FIG. 11 illustrates a network supporting and implementing an example implementation of the impulse purchase prompting system and method 100. The one or more lockers 110*a*, 110*b* may include one or more ethernet ports or Wi-Fi modules for communication with both a customer and a fulfillment associate. API integration may enable transmission of vend commands to the lockers 110*a*, 110*b*. Further, inventory may be tracked by VMS (Vending Management System). Both the API and VMS may provide feedback into a grocery picker or retail mobile application. The network may be implemented and controlled by a retailer. Additionally, the mobile device of a customer and the mobile device of a fulfillment associate may both connect directly to the retailer network or via another connection method. For example, the customer mobile device and the fulfillment associate mobile device may both connect to a cellular network that communicates with a retailer network. Also, in examples, the customer mobile device and the fulfillment associate mobile device may connect with one or more remote servers, instead of or in addition to, connecting to the retailer network. The one or more remote servers may be cloud servers.

The embodiment(s) described above may be combined in full or in part, with any alternative embodiment(s) described.

Exemplary System Architecture

Architecturally, the representative technology may be deployed at retail locations where grocery and/or other product pick-up is undertaken. Embodiments of the disclosed system and method 100 are described with reference to FIGS. 1-11. In certain aspects, the system and/or method 100 may be implemented using hardware or a combination of software and hardware, either by dedicated devices and networks or integrated into other computing resource(s) or distributed across a plurality of computer resources. Computing device(s) and networks implementing the system and/or method 100 may be, for example, desktop computers, mobile computers, dashboard mounted computers, other in-vehicle computers, voice-controlled or voice activated devices, tablet computers (e.g., including e-book readers), mobile devices (e.g., a smartphone or personal digital assistant), set top boxes (e.g., for a television), video game consoles, smart watches, or any other devices having appropriate processor, memory, and communications capabilities for gathering, storing, processing, and transmitting the data associated with the system and method 100.

The disclosed systems and methods can be implemented with a computer system, using, for example, software, hardware, or a combination of both, either in a dedicated server, a cloud server-based platform, or integrated into another entity, or distributed across multiple entities. An exemplary computer system includes a bus or other communication mechanism for communicating information, and a processor coupled with the bus for processing information. The processor may be locally or remotely coupled with the bus. By way of example, the computer system may be implemented with one or more processors. The processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The computer system also includes a memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus for storing information and instructions to be executed by processor.

According to one aspect of the present disclosure, the disclosed system can be implemented using a computer system in response to a processor executing one or more sequences of one or more instructions contained in memory. Such instructions may be read into memory from another machine-readable medium, such as data storage device. Execution of the sequences of instructions contained in main memory causes the processor to perform the process steps described herein. One or more processors in a multi-processing arrangement may also be employed to execute the sequences of instructions contained in memory. In alternative implementations, hard-wired circuitry may be used in place of or in combination with software instructions to implement various implementations of the present disclosure. Thus, implementations of the present disclosure are not limited to any specific combination of hardware circuitry and software. According to one aspect of the disclosure, the disclosed system can be implemented using one or many remote elements in a computer system (e.g., cloud computing), such as a processor that is remote from other elements of the exemplary computer system described above.

The invention extends to methods, systems, kits of parts and apparatus substantially as described herein and/or as illustrated with reference to the accompanying figures.

The invention extends to any novel aspects or features described and/or illustrated herein. In addition, apparatus aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode presently known for carrying out the disclosure. It should be understood that the illustrated embodiments are exemplary only, and should not be taken as limiting the scope of the disclosure.

What is claimed is:

1. A method of prompting impulse purchases, comprising:
   detecting a position of a customer at an impulse purchase location via an impulse purchase prompt initiator including a processor, the impulse purchase location including a pickup location and a waiting location spaced away from the pickup location, the detection of the position of the customer executed via at least one of a Bluetooth connection, a geofence detection, a wireless connection, or a camera detection, wherein the detecting of the position of the customer further includes detecting, via the impulse purchase prompt initiator, arrival of a customer vehicle within which the customer is situated at the waiting location;
   in response to the arrival of the customer vehicle at the waiting location which is located a predetermined distance away from the pickup location and in advance of the customer arriving at the pickup location, automatically transmitting, via the impulse purchase prompt initiator, an impulse purchase prompt to the customer such that the customer receives the impulse purchase prompt while situated in the customer vehicle;
   fulfilling, in near-real time, an impulse purchase request transmitted by the customer in response to the impulse purchase prompt via the impulse purchase prompt initiator automatically sending a signal to a communications module of an automated locker located at the pickup location and including at least one storage compartment, the communications module being communicatively coupled to the impulse purchase prompt initiator, wherein the signal is indicative of the impulse purchase request transmitted in response to the impulse purchase prompt; and
   automatically opening the at least one storage compartment and dispensing a product associated with the impulse purchase request prior to arrival of the customer or a fulfilment associate at the automated locker, wherein the automatic sending of the signal to the communications module of the automated locker automatically causes the at least one storage compartment to open and dispense the product prior to arrival of the customer or a fulfilment associate at the automated locker,
   wherein the at least one storage compartment is temperature controlled so as to lower a temperature of the product, and wherein the impulse purchase prompt is only automatically transmitted in response to the temperature of the product being equal to or less than a predetermined temperature.

2. The method of claim 1, wherein the detection of the customer comprises an interaction with a mobile device associated with the customer.

3. The method of claim 2, wherein the impulse purchase prompt comprises a notification on the mobile device associated with the customer.

4. The method of claim 3, wherein the impulse purchase prompt opens a mobile application associated with an impulse purchase location in response to approval of the notification by the customer.

5. The method of claim 2, wherein the interaction comprises a user-initiated interaction with an information carrier present at an impulse purchase location.

6. The method of claim 5, wherein the user-initiated interaction comprises scanning a QR code with the mobile device associated with the customer.

7. The method of claim 1, wherein the at least one storage compartment includes a first storage compartment and a second storage compartment, the first storage compartment having a first internal temperature that is lower than a second internal temperature of the second storage compartment, and wherein the method further includes adjusting the first internal temperature and the second internal temperature in response to seasonal changes in impulse purchasing behavior of customers.

8. The method of claim 7, wherein the at least one storage compartment includes a single location of interaction which includes a dispensing location at which a product associated with the impulse purchase request is dispensed and a QR code scanning location.

9. The method of claim 1, further comprising, in response to the impulse purchase request being transmitted by the customer in response to the impulse purchase prompt, automatically transmitting, via the impulse purchase prompt initiator, a further impulse purchase prompt to the customer that is related to the product associated with the impulse purchase request.

10. The method of claim 1, wherein the waiting locating includes one of a vehicle parking spot, a fuel pump of a refueling station, or a vehicle lane leading to a drive-through window.

11. The method of claim 1, wherein the impulse purchase prompt comprises a notification on the mobile device associated with the customer, and wherein the impulse purchase request is transmittable via a mobile application on the mobile device so as to enable the customer to transmit the impulse purchase request during the waiting period and prior to arrival of the product associated with the impulse purchase request to the customer.

12. A method of prompting impulse purchases, comprising:
    detecting a position of a customer at an impulse purchase location via an impulse purchase prompt initiator including a processor, the impulse purchase location including a pickup location and a waiting location spaced away from the pickup location, wherein the detecting of the position of the customer further includes detecting, via the impulse purchase prompt initiator, arrival of a customer vehicle within which the customer is situated at the waiting location,
    in response to the arrival of the customer vehicle at the waiting location which is located a predetermined distance away from the pickup location, automatically transmitting, via the impulse purchase prompt initiator, an impulse purchase prompt to the customer such that the customer receives the impulse purchase prompt at an initiation of or during a waiting period during which the customer will wait for fulfillment of an impulse purchase request by a fulfillment associate, wherein the waiting period is defined between the arrival of the customer vehicle at the waiting location and the fulfillment associate delivering a product associated with the impulse purchase request to the customer; and
    fulfilling, in near-real time, the impulse purchase request transmitted by the customer in response to the impulse purchase prompt via the impulse purchase prompt initiator (1) automatically transmitting information regarding the impulse purchase request to the fulfillment associate indicating that the product associated with the impulse purchase request is to be retrieved and transported to the customer situated in the customer vehicle, and (2) automatically sending a signal to a communications module of an automated locker located at the pickup location and including at least one storage compartment, the communications module being communicatively coupled to the impulse purchase prompt initiator, wherein the signal is indicative of the impulse purchase request transmitted in response to the impulse purchase prompt; and
    automatically opening the at least one storage compartment and dispensing a product associated with the impulse purchase request prior to arrival of the fulfilment associate at the automated locker, wherein the automatic sending of the signal to the communications module of the automated locker automatically causes the at least one storage compartment to open and dispense the product prior to arrival of the customer or a fulfilment associate at the automated locker,
    wherein the at least one storage compartment is temperature controlled so as to lower a temperature of the product, and wherein the impulse purchase prompt is only automatically transmitted in response to the temperature of the product being equal to or less than a predetermined temperature.

13. The method of claim 12, wherein the detection of the position of the customer is executed via at least one of a Bluetooth connection, a geofence detection, a wireless connection, or a camera detection.

14. The method of claim 12, wherein the at least one storage compartment includes a first storage compartment and a second storage compartment, the first storage compartment having a first internal temperature that is lower than a second internal temperature of the second storage compartment, and wherein the method further includes adjusting the first internal temperature and the second internal temperature in response to seasonal changes in impulse purchasing behavior of customers.

15. The method of claim 14, wherein the at least one storage compartment includes a single location of interaction which includes a dispensing location at which a product associated with the impulse purchase request is dispensed and a QR code scanning location.

16. The method of claim 12, further comprising in response to the impulse purchase request being transmitted by the customer in response to the impulse purchase prompt, automatically transmitting, via the impulse purchase prompt initiator, a further impulse purchase prompt to the customer that is related to the product associated with the impulse purchase request.

17. The method of claim 12, wherein the detection of the customer comprises an interaction with a mobile device associated with the customer.

18. The method of claim 12, wherein the information regarding the impulse purchase request to the fulfillment associate indicating that the product associated with the impulse purchase request is to be retrieved and transported to the customer includes at least one of location of a product, delivery information, pick-up information, customer preferences, payment information, and/or timing information for the request.

19. A system for implementing impulse purchase fulfillment, comprising:
    at least one impulse purchase prompt automatically transmitted to a customer located at an impulse purchase location including a waiting location, the automatic transmission being carried out via an impulse purchase prompt initiator in response to an arrival of the customer at the waiting location which is located a predetermined distance away from the pickup location and in advance of the customer arriving at the pickup location, such that the customer receives the impulse purchase prompt at an initiation of or during a waiting period during which the customer will wait for fulfillment of an impulse purchase request by a fulfillment associate, wherein the waiting period is defined between the arrival of the customer at the waiting location and the fulfillment associate delivering a product associated with the impulse purchase request to the customer, the impulse purchase prompt initiator including a processor and configured to detect a position of the customer via at least one of a Bluetooth connection, a geofence detection, a wireless connection, or a camera detection, wherein activation of the at least one impulse purchase prompt by the customer is detectable by the system, at least one fulfillment method of at least one product associated with the at least one impulse purchase prompt carried out in response to an impulse purchase request transmitted by the customer in response to the impulse purchase prompt, wherein access to the at least one product is facilitated by the at least one fulfillment method dependent upon features of the impulse purchase location and the at least one impulse purchase prompt, and wherein the at least one fulfillment method comprises:
  automatically transmitting information regarding the impulse purchase request to the fulfillment associate indicating that the product associated with the impulse purchase request is to be retrieved and transported to the customer in response to the impulse purchase request;
  automatically sending a signal to a communications module of an automated locker including at least one storage compartment, the communications module being communicatively coupled to the impulse purchase prompt initiator, wherein the signal is indicative of the impulse purchase request transmitted in response to the impulse purchase prompt; and
  automatically opening the at least one storage compartment and dispensing the at least one product prior to arrival of the fulfilment associate at the automated locker, wherein the automatic sending of the signal to the communications module of the automated locker automatically causes the at least one storage compartment to open and dispense the product prior to arrival of the fulfilment associate at the automated locker, and wherein the at least one storage compartment is temperature controlled so as to lower a temperature of the product, and wherein the impulse purchase prompt is only automatically transmitted in response to the temperature of the product being equal to or less than a predetermined temperature.

* * * * *